US010674070B2

United States Patent
Kasamatsu et al.

(10) Patent No.: US 10,674,070 B2
(45) Date of Patent: *Jun. 2, 2020

(54) ADJUSTING METHOD OF CAMERA MODULE, LENS POSITION CONTROL DEVICE, CONTROL DEVICE OF LINEAR MOVEMENT DEVICE, AND CONTROLLING METHOD OF THE SAME

(71) Applicant: ASAHI KASEI MICRODEVICES CORPORATION, Tokyo (JP)

(72) Inventors: Arata Kasamatsu, Tokyo (JP); Kazuomi Isogai, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,023

(22) Filed: Oct. 25, 2018

(65) Prior Publication Data

US 2019/0068871 A1 Feb. 28, 2019

Related U.S. Application Data

(62) Division of application No. 15/037,410, filed as application No. PCT/JP2014/005973 on Nov. 28, 2014, now Pat. No. 10,154,189.

(30) Foreign Application Priority Data

Dec. 4, 2013 (JP) .................................. 2013-251217

(51) Int. Cl.
G03B 13/00 (2006.01)
H04N 5/232 (2006.01)
(Continued)

(52) U.S. Cl.
CPC ........... H04N 5/23212 (2013.01); G02B 7/08 (2013.01); G02B 7/09 (2013.01); H04N 5/2257 (2013.01)

(58) Field of Classification Search
CPC .................................................. H04N 5/23212
See application file for complete search history.

(56) References Cited

U.S. PATENT DOCUMENTS 5,745,804 A * 4/1998 Iwane ...................... G02B 7/36
396/135
6,178,051 B1 * 1/2001 Tanaka .................. G02B 7/102
359/696
(Continued)

FOREIGN PATENT DOCUMENTS

JP 2002-156573 A 5/2002
JP 2003-337277 A 11/2003
(Continued)

OTHER PUBLICATIONS

International Preliminary Report on Patentability dated Jun. 16, 2016, for the corresponding International Application No. PCT/JP2014/005973.

(Continued)

*Primary Examiner* — Stephen P Coleman
(74) *Attorney, Agent, or Firm* — Morgan, Lewis & Bockius LLP

(57) ABSTRACT

An adjusting method of a camera module, a lens position control device, a control device of a linear movement device, and a controlling method of the same are provided in a state of the cameral module in which an imaging element and an actuator are combined. The camera module includes a position sensor (53) that detects a position of a lens (50) to output a detection position signal, a storage unit (541) that stores and rewrites a position code value corresponding to the position of the lens, a target position signal (Continued)

generation unit (542) that outputs a target position signal based on the position code value and the target position code value, and a control unit (543) that generates a control signal based on the target position signal and the detection position signal.

7 Claims, 10 Drawing Sheets

(51) Int. Cl.
    *G02B 7/08*     (2006.01)
    *H04N 5/225*     (2006.01)
    *G02B 7/09*     (2006.01)

(56) References Cited

U.S. PATENT DOCUMENTS

| | | |
|---|---|---|
| 2007/0177862 A1 | 8/2007 | Terayama et al. |
| 2009/0185285 A1* | 7/2009 | Abe ................... G03B 3/10 359/694 |
| 2010/0322612 A1 | 12/2010 | Tsuda et al. |
| 2012/0120303 A1 | 5/2012 | Yamanaka |
| 2013/0038781 A1 | 2/2013 | Inaji et al. |
| 2013/0148008 A1* | 6/2013 | Ikeda ................... G03B 17/14 348/345 |
| 2014/0028854 A1* | 1/2014 | Heinke ................... H04N 5/33 348/164 |

FOREIGN PATENT DOCUMENTS

| | | |
|---|---|---|
| JP | 2011-022563 A | 2/2011 |
| JP | 2012-103635 A | 5/2012 |
| JP | 2013-099139 A | 5/2013 |
| WO | 2012/114770 A1 | 8/2012 |

OTHER PUBLICATIONS

International Search Report dated Mar. 3, 2015, for International application No. PCT/JP2014/005973.

\* cited by examiner

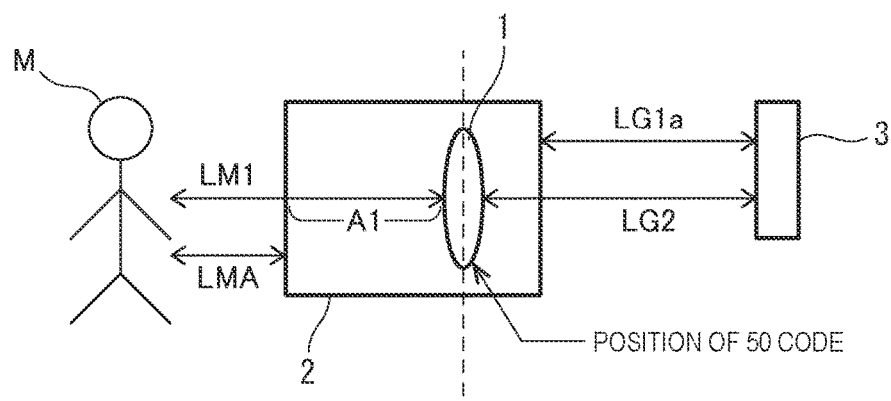
FIG. 7A
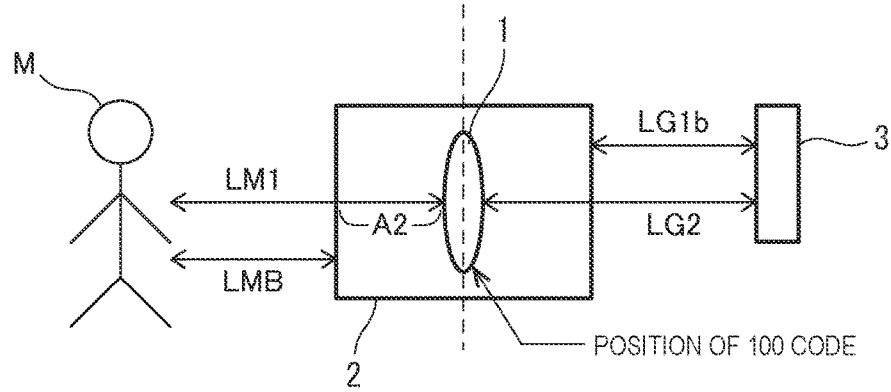
FIG. 7B
FIG. 8
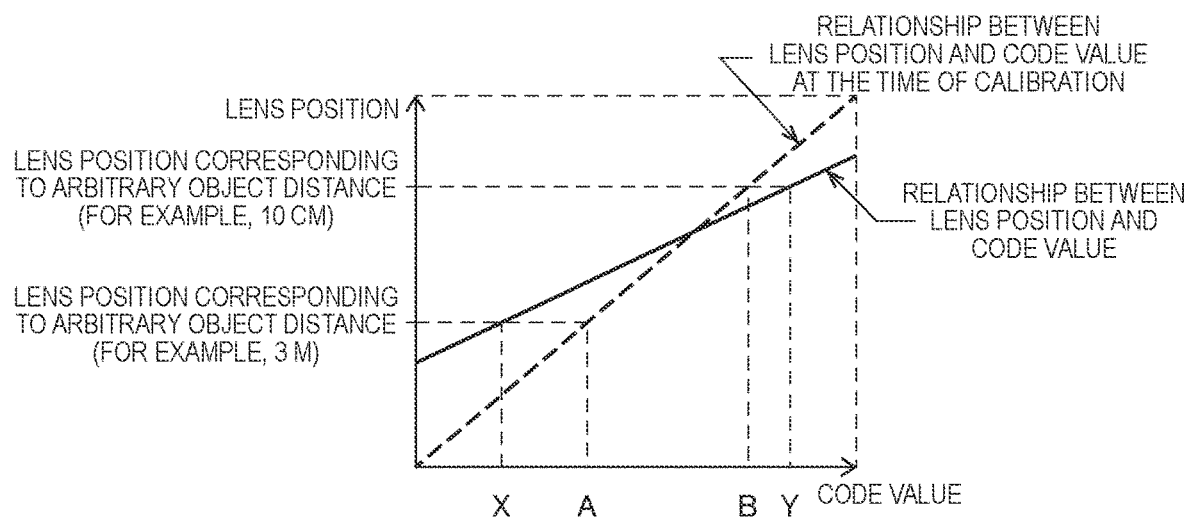

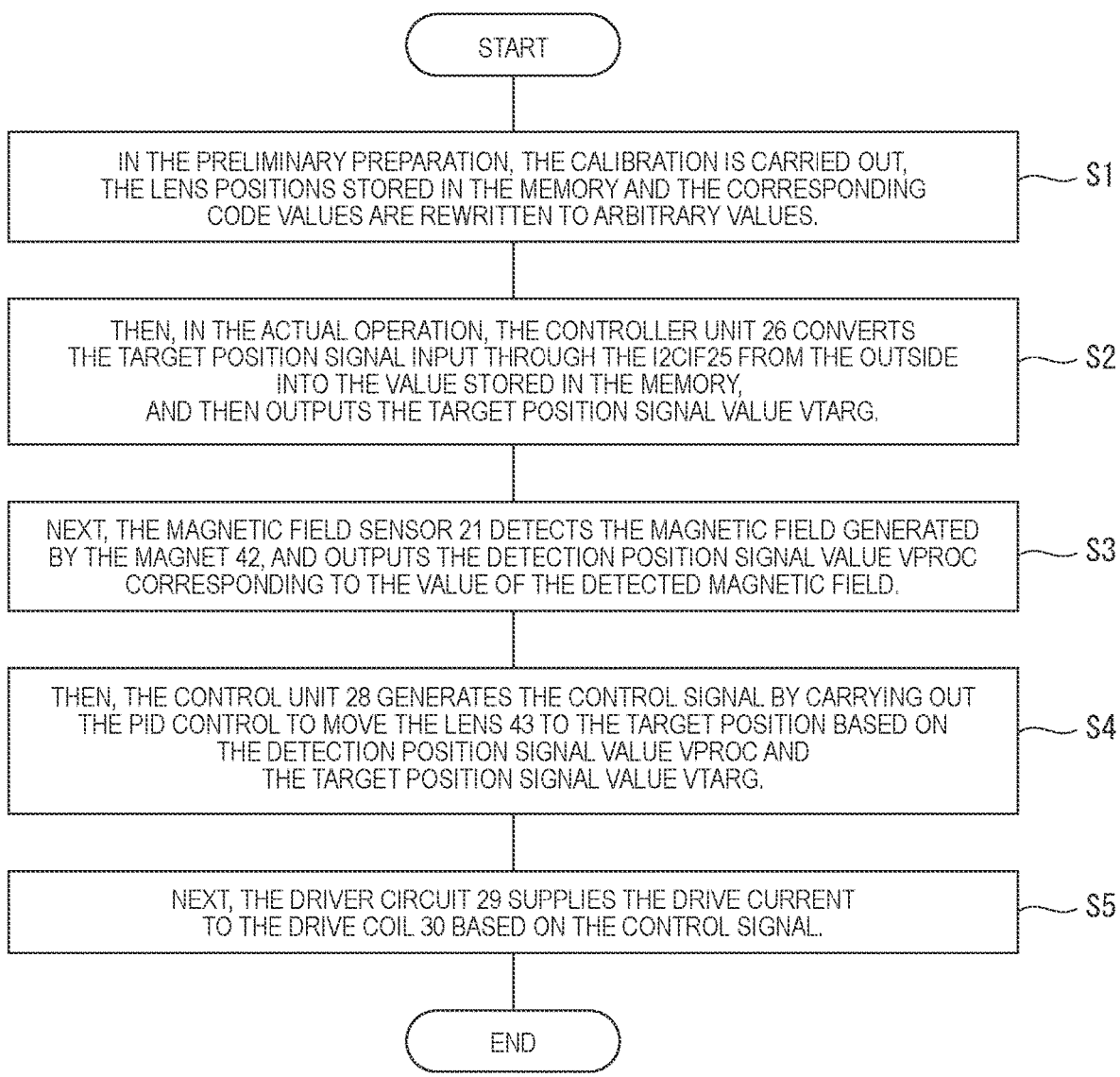

ADJUSTING METHOD OF CAMERA MODULE, LENS POSITION CONTROL DEVICE, CONTROL DEVICE OF LINEAR MOVEMENT DEVICE, AND CONTROLLING METHOD OF THE SAME

This is a divisional of U.S. application Ser. No. 15/037,410, filed May 18, 2016, which application claims the priority benefit of Japanese PCT Application No. PCT/JP2014/005973 filed on Nov. 28, 2014, which claims the priority benefit of Japanese Patent Application No. 2013-251217, all of which are incorporated herein by reference for all purposes as if fully set forth herein.

TECHNICAL FIELD

This present invention relates to an adjusting method of a camera module, a lens position control device, a control device of a linear movement device, and a controlling method of the same, and in particular, to an adjusting method of a camera module, a lens position control device, a control device of a linear movement device, and a controlling method of the same, in a state of a camera module in which an imaging element and an actuator are combined, any number of one or more focus object distances (a distance between a focusing lens and an imaging element in any object distance) can be optimized.

BACKGROUND ART

Automatic Focus (AF) function is provided in most of the camera modules equipped in smart phones that are multi-functional mobile telephones, which are highly compatible with general digital cameras, mobile telephones, and the Internet, and which are manufactured on the basis of functionalities of personal computers. Such AF function equipped in such compact cameras often adopts a contrast detection method. The contrast detection method is a method of actually moving the lens, detecting the lens position where the contrast of an object in a picked-up image is maximized, and moving the lens to the position.

The above-described contrast detection method can be realized at a lower cost than that of the active method of irradiating infrared rays or ultrasonic waves onto the object, and measuring a distance to the object by use of the reflected waves. However, the contrast detection method has a drawback that it takes time to search for the lens position where the contrast of the object is maximized. For this reason, there is a demand that after a user presses the shutter button halfway, a process of focusing on the object should be completed as soon as possible.

In the meantime, the number of pixels of the camera modules equipped in the general digital cameras and the mobile telephones is increasing year by year, and even with such compact cameras, high-definition images can be taken. In the high-definition images, defocusing is easily noticeable and more highly precise AF control is demanded.

Additionally, in general, a device that an input signal and a displacement depending on the input signal can be represent by a linear function is referred to as a linear movement device. Such a linear movement device includes, for example, an AF lens of a camera.

FIG. 1 is a configuration view illustrating a control device of a conventional linear movement device disclosed in patent literature 1. The control device of a linear movement device 112 illustrated in FIG. 1 includes a magnetic field sensor 113, a differential amplifier 114, a non-inverted output buffer 115, an inverted output buffer 116, a first output driver 117, and a second output driver 118. The linear movement device 112 is feedback controlled by the control device, and includes a lens (not illustrated) and a magnet 110.

The magnetic field sensor 113 generates a signal based on the detected magnetic field, and outputs an output signal SA. The output signal SA from the magnetic field sensor 113 and a device position instruction signal SB are respectively input into a non-inverting input terminal and an inverting input terminal of the differential amplifier 114. The differential amplifier 114 that has received the output signal SA from the magnetic field sensor 113 and the device position instruction signal SB outputs an operation amount signal SC representing operation amounts (the product of deviation and amplification degree) of the output drivers 117 and 118.

The magnitude of the operation amount signal SC changes the direction and amount of the current flowing across the coil 111 of the linear movement device 112. The current flowing across the coil 111 changes (moves) the position of the linear movement device 112 including the magnet 110. In this situation, the output signal SA from the magnetic field sensor 113 changes in association with the movement of the magnet 110. The control device detects the position of the linear movement device 112 with a change in the output signal SA, and carries out the feedback control so that the detected position corresponds to a position instructed by the device position instruction signal SB.

CITATION LIST

Patent Literature

PTL1: JP 2013-99139 A

SUMMARY

Technical Problem

In producing the camera module, however, the distance between the lens and the image that is generated when the linear movement device 112 and an image sensor are assembled has to be adjusted in many cases.

In general, the position of an end point on the image sensor side in the linear movement device 112 is configured to be operable, a mechanical adjustment is made when it is assembled with the image sensor, or an input range of the position instruction signal SB is limited, in many cases. In the mechanical adjustment, since the linear movement device needs a configuration for adjustment, the manufacturing costs are increased, or since the linear movement device is physically adjusted, the manufacturing hours are increased. Besides, when the input range of the position instruction signal SB is limited, the resolution of the position control might be roughened and accurate position control cannot be carried out.

Further, ICs for common AF function provide, for example, a method of correcting an interference on the coil magnetic field to be applied to the magnetic sensor (for example, see PLT 1) in a view point of effectively utilizing the AF lens between two mechanical end points in the actuator to improve the image quality, as a function of an actuator only. That is to say, the conventional art discloses the image quality to be improved by the actuator only, but does not disclose that the image quality is improved as a camera module.

In a prior art technology, after the camera module is assembled, each camera module uses a method of moving the AF lens to either one of a mechanical end point_FULL or another mechanical end point_HOME in the actuator, making an adjustment to mechanically move the AF lens secured to the magnet, and reducing a variation in the object distance at the time of focusing on at either one of the mechanical end point_FULL or the mechanical end point_HOME. However, in this method, as described above, since the linear movement device needs a configuration for adjustment, the manufacturing costs are increased, or since the linear movement device is physically adjusted, the manufacturing hours are increased.

The present invention has been made in view of the above circumstances, and has an object to provide an adjusting method of a camera module, a lens position control device, a control device of a linear movement device, and a controlling method of the same, in a state of a camera module in which an imaging element and an actuator are combined, any number of one or more focus object distances can be optimized.

Solution to Problem

According to one aspect of the present invention, there is provided an adjusting method of a camera module, the camera module including a lens, an imaging element that outputs an image signal of an object; a signal processing circuit that outputs a target position code value of the lens from the image signal; a position sensor that detects a position of the lens and outputting a detection position signal; a lens position control circuit including a storage unit that stores a position code value corresponding to the position of the lens to be capable of rewriting the position code value, a target position signal generation unit that outputs a target position signal based on the position code value and the target position code value, and a control unit that generates a control signal based on the target position signal and the detection position signal; and a drive unit that moves the lens based on the control signal, the adjusting method including: a first step of moving the lens to a first lens position to focus on the object located at a first position for a first focus distance; and a second step of rewriting the position code value stored in the storage unit to another position code value such that a moving range of the lens is limited based on the first focus distance.

(2); The above (1) may further including a third step of moving the lens to a second lens position to focus on the object located at a second position for a second focus distance, wherein the second step may include rewriting the position code value stored in the storage unit to the another position code value such that the moving range of the lens is limited based on the first focus distance and the second focus distance.

(3); In the above (2), the second step may include rewriting the position code value stored in the storage unit to the another position code value corresponding to a plurality of the positions between the first lens position and the second lens position.

(4); In any one of the above (1) to (3), the second step may include rewriting the position code value stored in the storage unit to the another position code value such that the lens moves between the first position for a proximate focus distance and the second position for an infinite focus point.

(5); In the above (2) or (3), the first focus distance may be a proximate focus and the second focus distance is an infinite focus, and the second step may include rewriting the position code value stored in the storage unit to the another position code value such that the lens moves between a plurality of the positions between the first lens position and the second lens position.

(6); In any one of the above (1) to (5), the position code value may include a conversion code to convert the target position code to the target position signal, and the second step includes rewriting the conversion code stored in the storage unit is rewritten to limit the moving range of the lens, or the position code value may include a matrix to convert the target position code to the target position signal, and the second step includes rewriting the matrix stored in the storage unit to limit the moving range of the lens.

(7); In any one of the above (1) to (6), the position code value stored in the storage unit beforehand may be a position code value corresponding to the position of the lens that moves from one end of a movable range of the lens to another end in the camera module.

(8); There is provided an adjusting method of a camera module, the camera module including: a lens; an imaging element outputting an image signal of an object; a conversion unit converting the image signal with a conversion factor into a target position signal that moves the lens to a target position; a position sensor detecting a position of the lens and outputting a detection position signal; a control unit generating a control signal based on the target position signal and the detection position signal; a drive unit moving the lens based on the control signal; and a storage unit storing the conversion factor that can be rewritten, the adjusting method including: a first step of moving the lens to a first lens position to focus on the object located at a first position for a first focus distance; a second step of moving the lens to a second lens position to focus on the object located at a second position for a second focus distance; and rewriting the conversion factor stored in the storage unit to limit a moving range of the lens based on the first focus distance and the second focus distance.

(9); An adjusting method of a camera module, the camera module including: a lens; an imaging element outputting an image signal of an object; a signal processing circuit outputting a target position code value of the lens from the image signal; a position sensor detecting a position of the lens and outputting a detection position signal; an adjustment unit adjusting the detection position signal with an adjustment signal that is rewritable and outputting an adjusted detection position signal; a lens position control circuit including a target position signal generation unit outputting a target position signal based on the target position code value, and a control unit generating a control signal based on the target position signal and the adjusted detection position signal; and a drive unit moving the lens based on the control signal, the adjusting method including: a first step of moving the lens to a first lens position to focus on the object located at a first position of a first focus distance; a second step of moving the lens to a second lens position to focus on the object located at a second position for a second focus distance; and a third step of rewriting the adjustment signal of the adjustment unit to limit a moving range of the lens based on the first focus distance and the second focus distance.

(10); In the above (9), the adjustment signal stored in the storage unit may beforehand adjust the detection position signal such that the lens moves from one end of a movable range of the lens to another end in the camera module.

(11); A lens position control device, including: a position sensor configured to detect a position of a lens, and to output a detection position signal; a storage unit configured to store a position code value corresponding to the position of the lens, the position code value being rewritable; a target position signal generation unit configured to output a target position signal based on the position code value and a target position code value representing a target position of the lens, and a control unit configured to generate a control signal to move the position of the lens based on the target position signal and the detection position signal.

(12); In the above (11), the position code value may convert the target position code value into the target position signal such that the lens moves between a first position of a proximate focus distance and a second position of an infinite focus point.

(13); The above (12) may further including a position code setting unit configured to set the position code value, wherein the position code setting unit may reset the position code value stored in the storage unit beforehand to another position code value.

(14); A control device of a linear movement device, the linear movement device including a magnet attached to a moving body, wherein a drive coil is arranged near the magnet of the linear movement device, such that a force generated by a coil electric current flowing across the drive coil moves a lens secured to the magnet, the control device including: a magnetic sensor configured to detect a magnetic field generated by the magnet, and to output a detection position signal value corresponding to a value of the detected magnetic field; a controller unit configured to output a target position signal value to instruct a target position to which the linear movement device is to move; a memory connected with the controller unit and configured to store a position of the lens and a code value corresponding to the position of the lens; a control unit configured to generate a control signal to move the lens to the target position based on the detection position signal value output from the magnetic sensor and the target position signal value output from the controller unit; and a driver circuit configured to supply a drive current to the drive coil based on the control signal output from the control unit, wherein the controller unit includes a code setting unit configured to set the code value stored in the memory.

(15); A control device of a linear movement device, the linear movement device including a magnet attached to a moving body, wherein a drive coil arranged near the magnet of the linear movement device, such that a force generated by a coil electric current flowing across the drive coil moves a lens secured to the magnet, the control device including: a magnetic sensor configured to detect a magnetic field generated by the magnet, and to output a detection position signal value corresponding to a value of the detected magnetic field; a controller unit configured to output a target position signal value to instruct a target position to which the linear movement device is to move; a memory connected with the controller unit and configured to store a position of the lens and a code value corresponding to the position of the lens; a code setting unit configured to set the code value stored in the memory; a control unit configured to generate a control signal to move the lens to the target position based on the detection position signal value output from the magnetic sensor and the target position signal value output from the controller unit; and a driver circuit configured to supply a drive current to the drive coil based on the control signal output from the control unit.

(16); In the above (14) or (15), the code setting unit may reset the position code value stored in the memory to another position code value.

(17); In any one of the above (14) to (16), the code setting unit may be configured such that a user is able to set the code value.

(18); In any one of the above (14) to (16), the code setting unit may be configured to set the code value an external signal input.

(19); In any one of the above (14) to (18), the control unit may generate the control signal by carrying out PID control.

(20); In any one of the above (14) to (19), the magnetic sensor may be a Hall element.

(21); In any one of the above (14) to (20), the linear movement device and the drive coil may be assembled in a camera module.

(22) A controlling method of a linear movement device, the linear movement device including a magnet secured to a moving body, wherein a drive coil is arranged near the magnet of the linear movement device, the controlling method including: carrying out calibration to rewrite a position of the lens stored in a memory and a cord value corresponding to the position of the lens to other values; converting by a controller unit a target position signal input through an interface from an outside of the linear movement device into the a value stored in the memory to output the target position signal value; detecting by a magnetic field sensor a magnetic field generated by the magnet to output a detection position signal value corresponding to a value of the detected magnetic field; generating by a control unit a control signal to move the lens to a target position based on the detection position signal value and the target position signal value by carrying out PID control; and supplying by a driver circuit a drive current to the drive coil based on the control signal.

Advantageous Effects

According to one aspect of the present invention, an adjusting method of a camera module, a lens position control device, a control device of a linear movement device, and a controlling method of the same are achievable, in a state of a cameral module in which an imaging element and an actuator are combined, any number of one or more focus object distances can be optimized. Regardless of a manufacturing variation of the camera module, highly precise image qualities are obtainable.

BRIEF DESCRIPTION OF DRAWINGS

FIG. 7A and FIG. 7B are views illustrating different positions of the lens for focusing on in an actuator for each camera module where the actuator and the imaging element are assembled;

FIG. 8 is a view illustrating relationships of the lens positions and the code values before and after the present invention is applied;

FIG. 11 is a view of a flowchart illustrating a controlling method of the linear movement device according to one aspect of the present invention.

DESCRIPTION OF EMBODIMENTS

In the following detailed description, lots of specified details will be described to provide complete understanding of embodiments of the present invention. However, it would be apparent that one or more embodiments can be carried out without such specified details. Additionally, in order to simplify the drawings, known configurations and devices are generally illustrated in schematic drawings.

Embodiment 1

Figure 1:
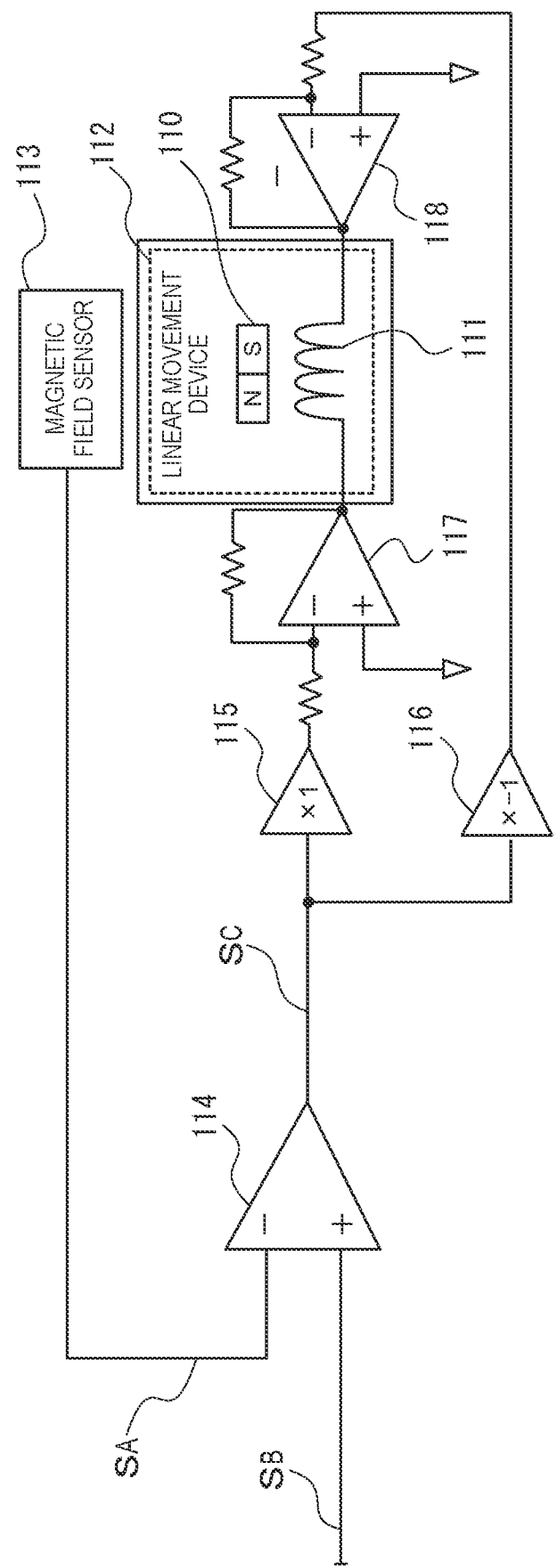
FIG. 1 is a configuration view illustrating a control device of a conventional linear movement device disclosed in patent literature 1.
Figure 2:
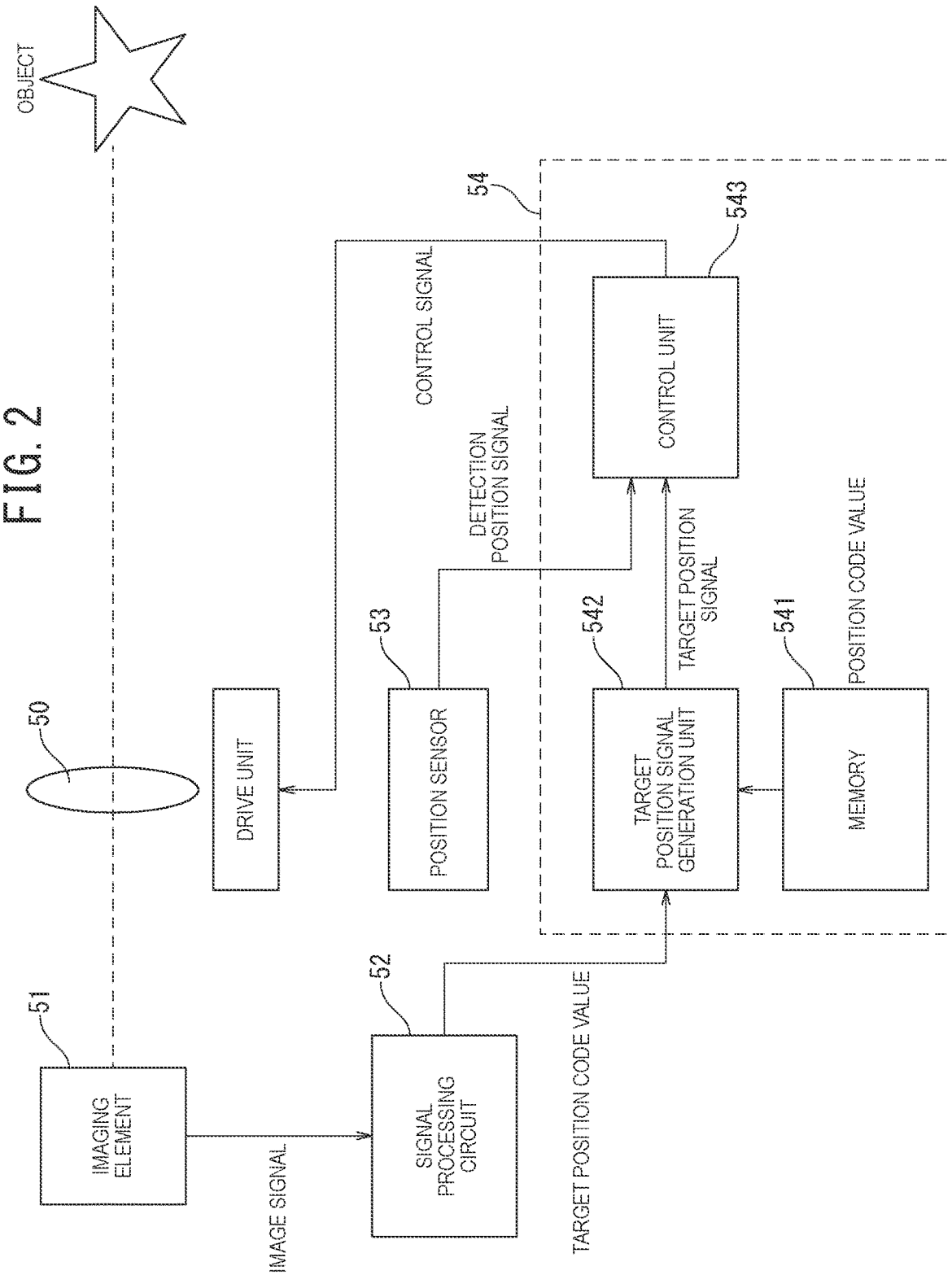
FIG. 2 is a configuration view illustrating a camera module in Embodiment 1 of the present invention.

FIG. 2 is a configuration view illustrating a camera module in Embodiment 1 of the present invention. In Embodiment 1, the camera module includes a lens 50, an imaging element 51 configured to output an image signal of an object, a signal processing circuit 52 configured to output a target position code value of the lens from an image signal, a position sensor 53 configured to detect a position of the lens and output a detection position signal, a lens position control circuit 54 configured to receive the target position code value and the detection position signal and to output a control signal, and a drive unit 55 configured to move the optical lens based on the control signal.

The imaging element 51 outputs the image signal. As the image signal includes, for example, a contrast signal in a contrast detection method. The signal processing circuit 52 calculates the target position code value based on the image signal, and outputs the calculated target position code value. The target position code value is a signal for moving the lens to the position for a focus distance of the object.

The position sensor 53 detects the position of the lens, and outputs the detection position signal. For example, the position sensor 53 may be a magnetic sensor for detecting a magnetic field produced by a magnet attached at the lens. As the magnetic sensor, a Hall element, a magneto-resistive element, or the like can be mentioned.

The lens position control circuit 54 includes a storage unit 541 that stores the position code value corresponding to a lens position of the lens and that can rewrite the position code value, a target position signal generation unit 542 that outputs the target position signal based on the position code value and the target position code value, and a control unit 543 that generates a control signal based on the target position signal and the detection position signal. The lens position control circuit 54 generates the control signal based on a difference between the detection position signal corresponding to a current lens position and the target position signal corresponding to a target lens position, and outputs the generated control signal.

The storage unit 541 stores the position code value corresponding to the lens position of the lens. In addition, the storage unit 541 is configured such that the position code value can be rewritten.

The target position signal generation unit 542 generates the target position signal corresponding to the target lens position based on the position code value that has been stored in the storage unit 541 and the target position code value that has been input. To be specific, when the target position code value and the target position signal has a linear relation based on the position code value, the target position signal is generated by converting the target position code value based on the position code value. In such a case, the position code value may be a matrix with the target position code value and the target position signal to be output, may be a conversion factor for linearly transforming the target position code value, or may be the target position signal corresponding to the target position code relating to two focus distances to operate the position code value relating to the two focus distances and output the target position signal. In other words, the target position signal generation unit 542 converts the target position code value with respect to the focus distance of the object into a distance between the lens and the position sensor (a signal corresponding to the detection position signal of the position sensor) to output the target position signal.

The control unit 543 generates the control signal based on the target position signal and the detection position signal. As the control unit 543, for example, a PID control circuit can be given. In addition, the control unit 543 may be configured to include a driver that outputs the control signal to a drive unit, as will be described later.

The drive unit 55 moves the lens based on the control signal. To be specific, a configuration in which the magnet attached with the lens is moved by a coil magnetic field generated by making a coil current generated based on the control signal flow across a coil can be given.

In addition, a position code value setting unit configured to rewrite the position code value stored in the storage unit 541 may be further included.

Adjusting Method of Camera Module

An adjusting method of the camera module in Embodiment 1 includes the following steps.

1) First Step a step of moving the lens to a first lens position to focus on an object located at a position for a first focus distance 2) Second Step a step of rewriting the position code value stored in the storage unit 541 to another position code value so that a moving range of the lens is limited based on the first focus distance The adjusting method of Embodiment 1 includes, for example, rewriting the position code value corresponding to the lens position from an end point in the camera module to another end point (one end of a movable range in the camera module to another end thereof) so that the moving range of the lens is limited based on the focus distance. In other words, the position code value from one mechanical end point to another mechanical end point is written to another position code value corresponding to the focus distance.

When the camera module is assembled, the distance between the imaging element and a module including the lens, the magnet, the sensor IC, and the like might be varied by an assembling error. In Embodiment 1, since the position code value is rewritten based on the focus distance, the range where the lens moves in the camera module can be limited uniformly based on focus distance. This is the adjustment to rewrite the position code value, and enables an easy adjustment of the assembling error. Further, the position code value is rewritten to limit the range where the lens moves based on the focus distance. Accordingly, the target position code value can be used in a full range, and hence, it is possible to adjust the camera module without degrading the resolving power.

In Embodiment 1, the following steps are further included.

3) Third Step a step of moving the lens to a second lens position to focus on the object located at a position for a second focus distance As the second step, the position code value may be rewritten to limit the moving range of the lens based on the second focus distance in addition to the first focus distance.

As the rewiring of limiting the moving range of the lens, following examples are given.

The second step may be configured to include rewriting the position code value stored in the storage unit to the position code value corresponding to plural positions between the first and second lens positions. In other words, the position code value corresponding to the lens position between one end point and another end point in the camera module is rewritten to another position code value based on the first focus distance and the second focus distance, so as to limit the moving range of the lens within a range between the first lens position and the second lens position. In this case, for example, on the first lens position side, an allowance (margin) of the moving range may be included. Accordingly, since the lens moves within the range having such an allowance, even with an environmental change such as a temperature change, the adjustment resistant to the environmental change is achievable.

In addition, the position code value stored in the storage unit can be rewritten based on the first focus distance and the second focus distance, so that the lens moves between the lens position for a proximate focus distance and the lens position for an infinite focus distance. In other words, the position code value corresponding to the lens positions between one end point and another end point in the camera module is rewritten based on the first focus distance and the second focus distance, so that the moving range of the lens is limited to a range between the lens position for a proximate focus distance and the lens position for an infinite focus distance.

It is to be noted that as the position code value stored beforehand in the storage unit is the position code value corresponding to the lens positions between one end point and another end point in the camera module (between one end and another end in the moving range of the camera module). That is the position code value after the calibration in an example to be described below.

Rewriting of Position Code Value

Figure 3:
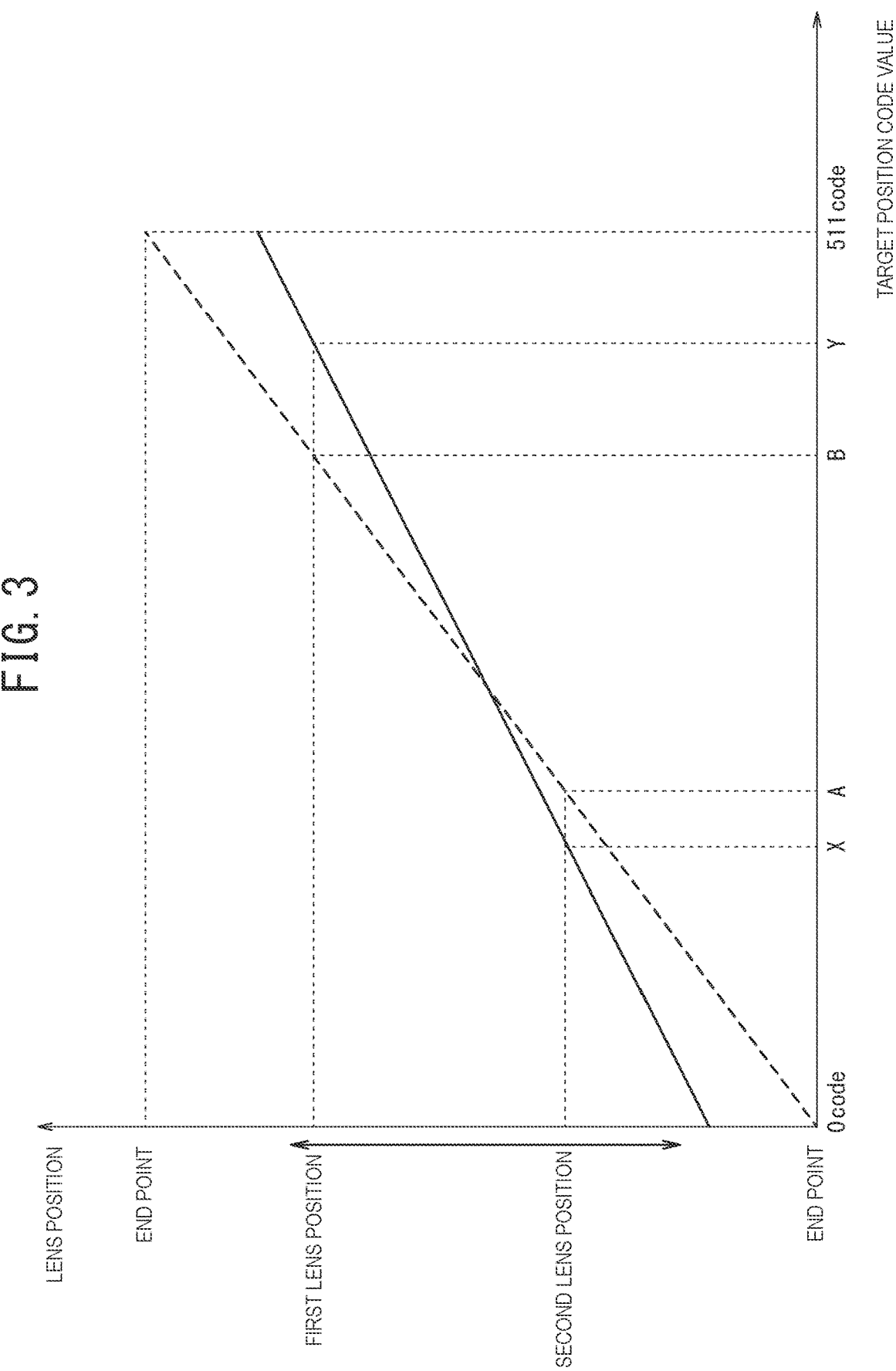
FIG. 3 is a graph illustrating relationships of a target position code value and a lens position.

FIG. 3 is a graph illustrating relationships of the target position code value and the lens position. The horizontal axis represents an example of 9 bits of the target position code value, and the vertical axis represents the lens position. The lens position corresponds to the detection position signal of the position sensor.

The dotted line represents a case of the position code value stored beforehand in the storage unit. When the target position code value is 0 code, the lens is located at an end point in the lens movable range. When the target position code value is 511 code, the lens is located at another end point in the lens movable range. This is an example in which the lens position changes linearly to the target position code value.

When the lens is moved to the first lens position in the above-described first step, the target position code value is B code. Then, in the second step, the position code value is rewritten so that the target position code value corresponding to the first lens position is Y code.

Similarly, when the lens is moved to the second lens position in the above-described third step, the target position code value is A code. Then, in the second step, the position code value is rewritten so that the target position code value corresponding to the second lens position is X code.

The solid line represents the rewritten position code value. The position code value is rewritten so that the moving range of the lens is narrower than the range in the case of the position code value stored beforehand in the storage unit.

In the camera module, when the vertical arrow of FIG. 3 represents the moving range of the lens between the proximate focus distance and the infinite focus distance, the dotted line in the conventional case includes the target position code values which are not used. On the other hand, the solid line represents that the target position code values can be used in a full range. Therefore, an assembling error can be adjusted without degrading the resolving power.

For example, when the position code values stored in the storage unit include a lens position Pf corresponding to 0 code and a lens position Ph corresponding to 511 code, the position code value setting unit rewrites the lens positions Ph and Pf to Phn and Pfn so that the target position code value B code corresponding to the first lens position becomes Y code, after the first step.

Embodiment 2

Figure 4:
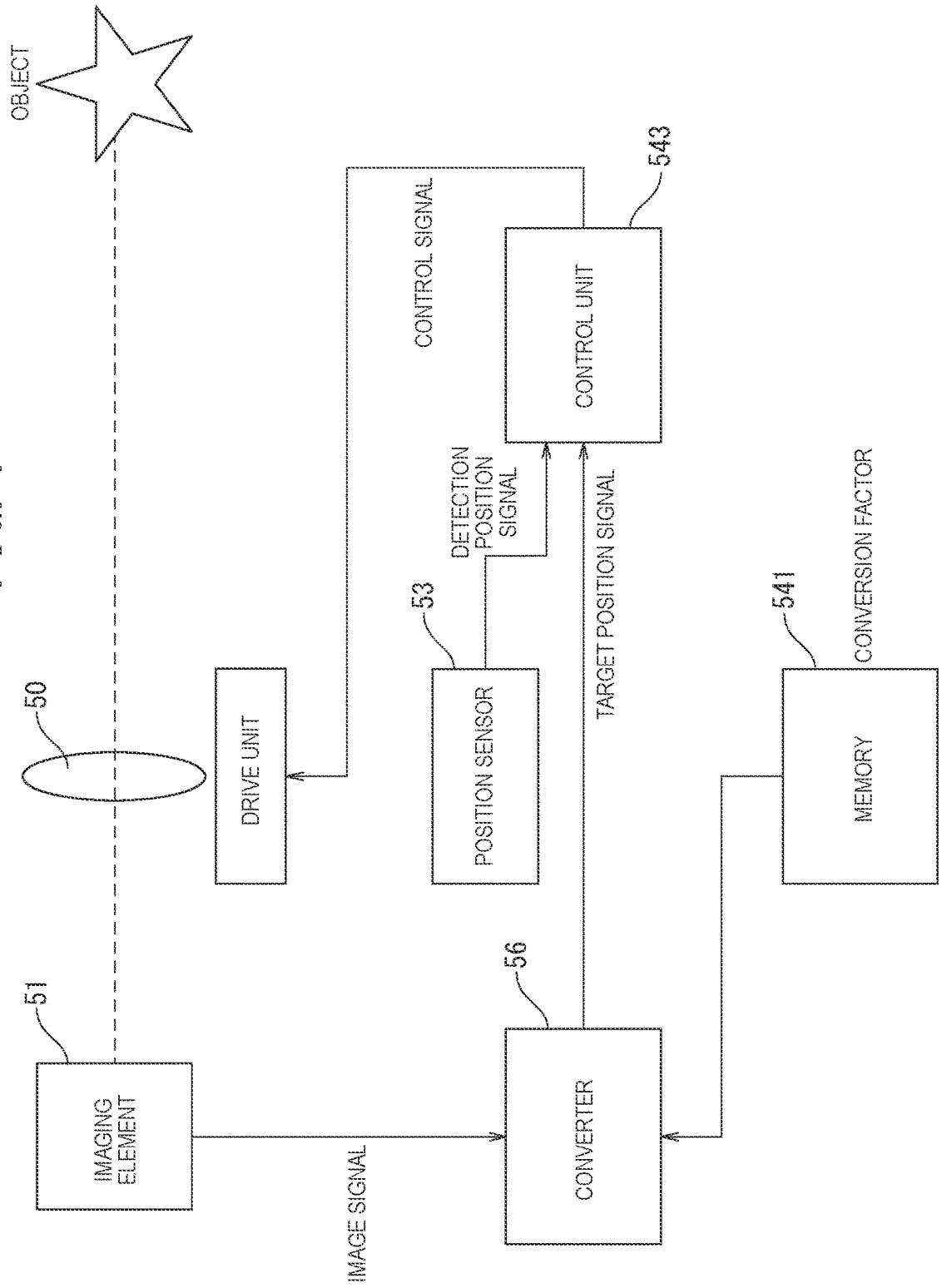
FIG. 4 is a configuration view illustrating a camera module in Embodiment 2 of the present invention.

FIG. 4 is a configuration view illustrating a camera module in Embodiment 2 of the present invention. In Embodiment 2, the camera module includes the lens 50, the imaging element 51, a converter 56 configured to convert the image signal on a conversion factor into the target position signal for moving the lens to a target position, the position sensor 53 configured to detect the position of the lens and output the detection position signal, the control unit 543 configured to generate a control signal based on the target position signal and the detection position signal, the drive unit 55, and a storage unit 541 configured to store the conversion factor and to rewrite the conversion factor.

The points different from Embodiment 1 will be described mainly.

The converter 56 converts the image signal into the target position signal and outputs the converted target position signal.

The storage unit 541 stores the conversion factor used to convert the image signal to the target position signal. In addition, the storage unit 541 is configured to be capable of rewriting the conversion factor.

Adjusting Method of Camera Module

An adjusting method of the camera module in Embodiment 2 includes the following steps.

1) First Step a step of moving the lens to a first lens position to focus on an object located at a position for a first focus distance 2) Second Step a step of moving the lens to a second lens position to focus on an object located at a position for a second focus distance 3) Third Step a step of rewriting the conversion factor stored in the storage unit so that a moving range of the lens is limited based on the first focus distance and the second focus distance In Embodiment 2, the conversion factor to convert the image signal into the target position signal is stored in the storage unit, and the converter calculates the target position signal based on the conversion factor. The conversion factor is rewritten based on the focus distance in the above-described third step, in a similar manner to the adjusting method in Embodiment 1.

In the camera module, when the vertical arrow of FIG. 3 represents the moving range of the lens between the most proximate focus distance and the infinite focus distance, the dotted line in the conventional case includes the target position code values which are not used. On the other hand, in the solid line, the target position code values can be used in a full range. Therefore, an assembling error can be adjusted without degrading the resolving power.

Embodiment 3

Figure 5:
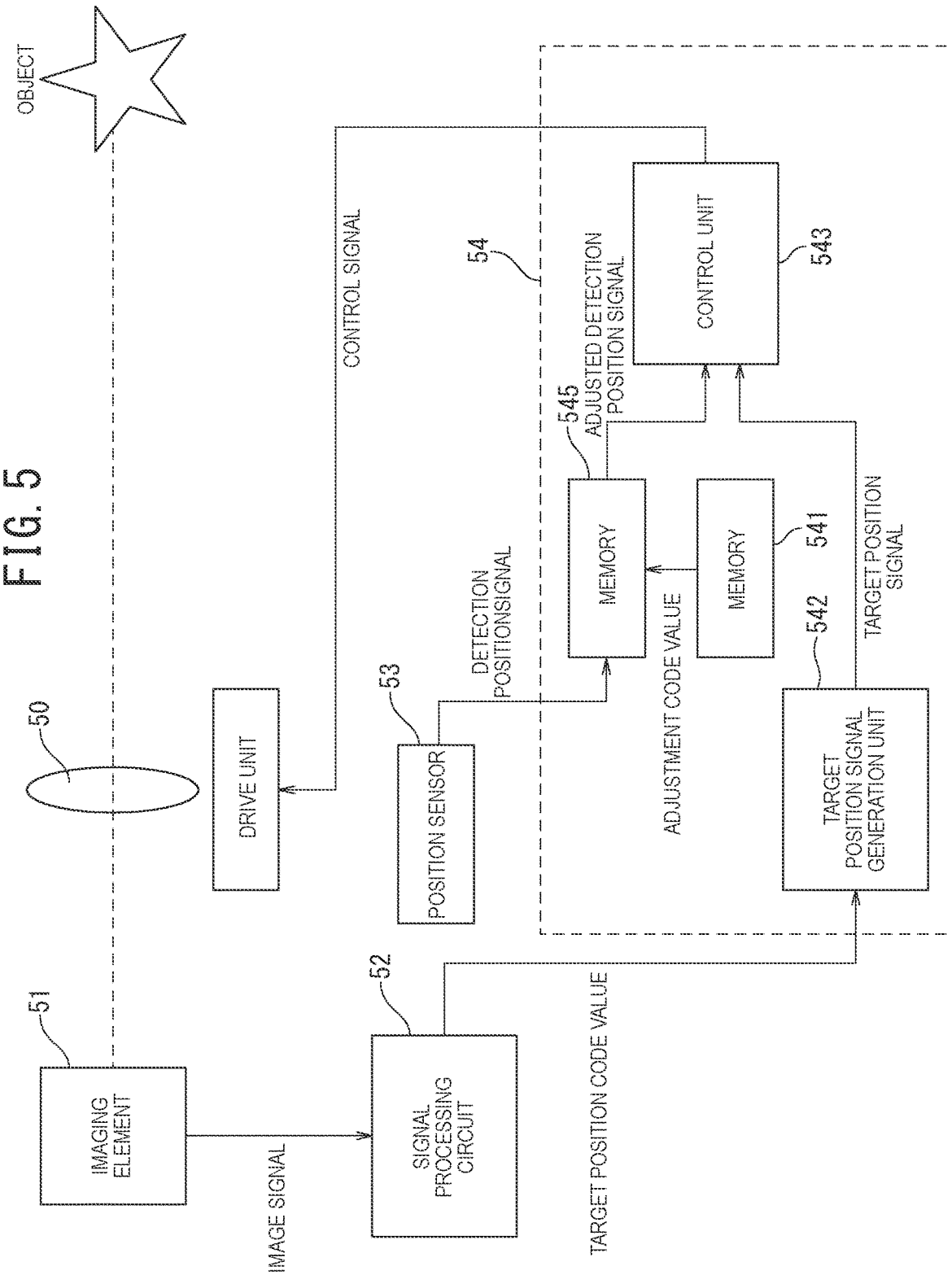
FIG. 5 is a configuration view illustrating a camera module in Embodiment 3 of the present invention.

FIG. 5 is a configuration view illustrating a camera module in Embodiment 3 of the present invention. The camera module in Embodiment 3 includes the lens 50, the imaging element 51, the signal processing circuit 52 configured to output the target position code value of the lens from the image signal, the position sensor 53 configured to detect the position of the lens 50 and to output the detection position signal, a lens position control circuit 54 including an adjustment unit 545 configured to adjust the detection position signal with an adjustment signal that can be rewritten and to output an adjusted detection position signal, and a target position signal generation unit 542 configured to output the target position signal based on the target position code value, the control unit 543 configured to generate a control signal based on the target position signal and the adjusted detection position signal, and the drive unit 55 configured to move the optical lens based on the control signal.

In Embodiment 3, on the position detection side, an adjustment code value for adjusting the position detection signal is rewritten based on the focus distance.

Adjusting Method of Camera Module

An adjusting method of the camera module in Embodiment 3 includes the following steps.

1) First Step
a step of moving the lens to a first lens position to focus on an object located at a position for a first focus distance
2) Second Step
a step of moving the lens to a second lens position to focus on an object located at a position for a second focus distance
3) Third Step
a step of rewriting the adjustment signal of the adjustment unit so that a moving range of the lens is limited based on the first focus distance and the second focus distance In Embodiment 3, the detection position signal is adjusted based on the adjustment code value of the adjustment unit. The adjustment code value is rewritten based on the focus distance in the above-described third step, in a similar manner to the adjusting method in Embodiment 1.

Figure 6:
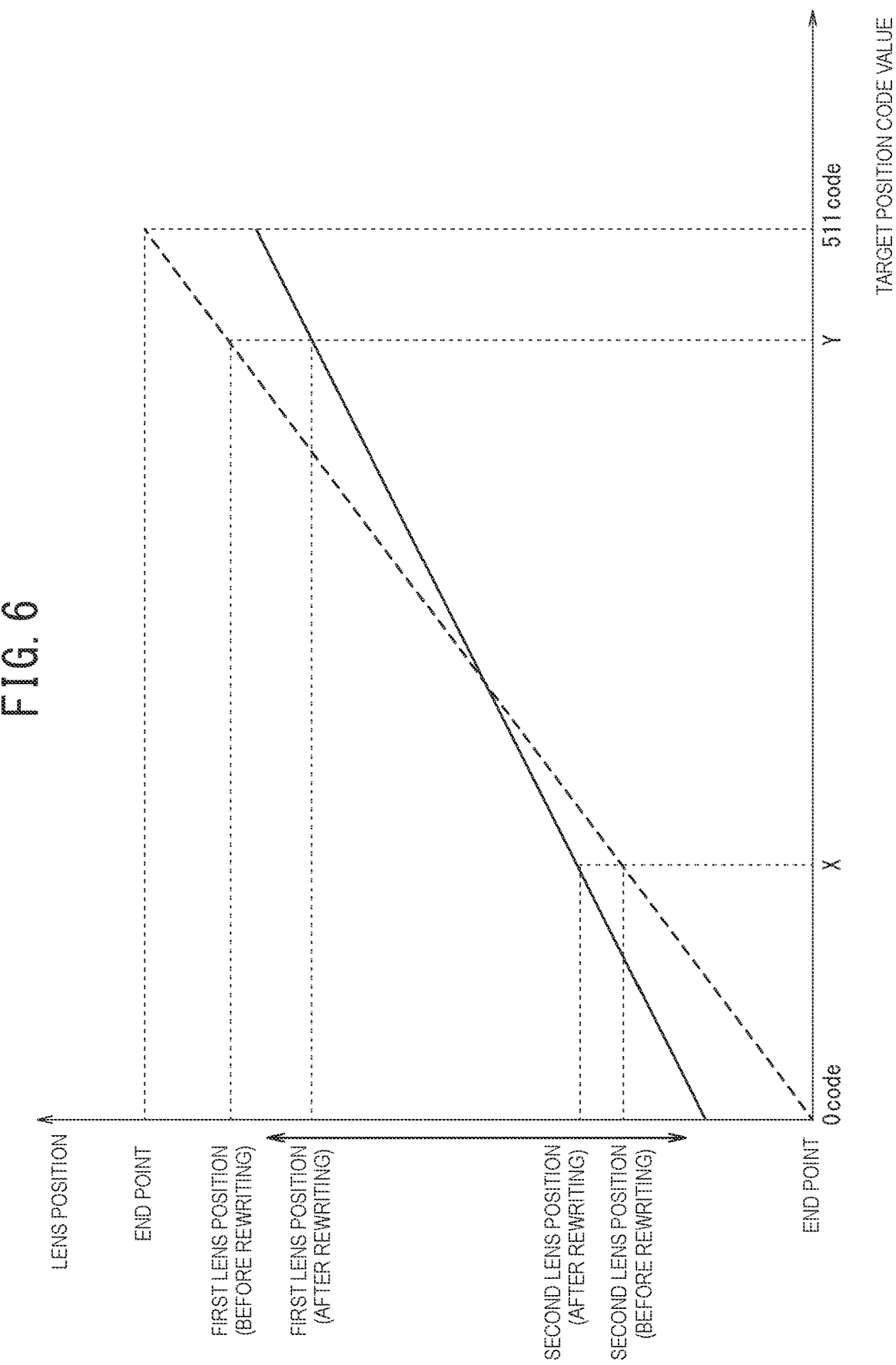
FIG. 6 is a graph illustrating relationships of the target position code value and the lens position.

FIG. 6 is a graph illustrating relationships of the target position code value and the lens position. The horizontal axis represents an example of 9 bits of the target position code value, and the vertical axis represents the lens position. The lens position corresponds to the detection position signal of the position sensor.

In the camera module, when the vertical arrow of FIG. 6 represents the moving range of the lens between the most proximate focus distance and the infinite focus distance, the dotted line in the conventional example includes the target position code values which are not used. On the other hand, the solid line represents that the target position code values can be used in a full range. Therefore, an assembling error can be adjusted without degrading the resolving power. It is to be noted that in Embodiment 3, since the detection position signal of the position sensor is subjected to a gain adjustment, the lens position corresponding to the target position code value will be changed. Also in such a case, it is possible to adjust the target position code value in a full range.

Examples

Examples of the present invention will be described with reference to the accompanied drawings.

Firstly, points of a control device of a linear movement device in the present example will be described.

FIG. 7A and FIG. 7B are views illustrating different positions of the lens for focusing on in an actuator for each camera module where the actuator and the imaging element are assembled. In the drawings, reference numeral 1 represents an AF lens, reference numeral 2 represents an actuator unit, and represents 3 represents an imaging element.

In FIG. 7A and FIG. 7B, a distance LM1 between an object M and the lens 1 is an object distance, a distance LG1 (i.e., LG1$a$ in FIG. 7A and LG1$b$ in FIG. 7B) between the actuator unit 2 and the imaging element 3 is a first gap, and a distance LG2 between the lens 1 and the imaging element 3 is a second gap.

The second gap LG2 is set to a constant distance by the object distance LM1. In other words, the object distance LM1 determines the optimal second gap LG2. Here, the first gap LG1 is changed by a variation in assembling of the actuator unit 2.

In FIG. 7A and FIG. 7B, the values of LG1$a$ and LG1$b$ are different, and a relation of LG1$a$>LG1$b$ is satisfied. In other words, the actuator unit 2 in FIG. 7A is more spaced apart from the imaging element 3 than from the actuator unit 2 in FIG. 7B.

Hence, since the second gap LG2 is set to a constant value by the object distance LM1, the position of lens 1 in the actuator unit changes. In other words, a distance A1 between an end on the object M side of the actuator unit 2 and the lens 1 in FIG. 7A is longer than a distance A2 between the end on the object M side of the actuator unit 2 and the lens 1 in FIG. 7B.

In FIG. 7A, for example, it is assumed that a code value (value of Position Register) presenting the position of the lens 1 is 50 code (Code). In FIG. 7B, the lens does not focus on at 50 code, but focuses on at 100 code. In other words, the code values at which the lens focuses on are different for every individual piece in which the actuator unit 2 is assembled.

Thus, in the present example, the code value having a variation is rewritten for every individual piece in which the actuator unit 2 is assembled. In both FIG. 7A and FIG. 7B, the lens position for focusing on is rewritten to an arbitrary code (Code).

FIG. 8 is a view illustrating relationships of the lens positions and the code values before and after the present example is applied. Immediately after the calibration, a thick dotted line of FIG. 7 represents a relationship between the code value and the lens position. In this case, Bcode is a code value representing a lens position corresponding to an arbitrary first object distance (for example, 10 cm), and Acode is a code value representing a lens position corresponding to an arbitrary second object distance (for example, 3 m).

Then, Acode is converted into Xcode, and Bcode is converted into Ycode. A viewpoint is to newly obtain a relationship of the lens position and a position register in a thick dotted line.

In other words, the above-described FIG. 7A and FIG. 7B, only a single lens position is illustrated. Acode (or Bcode) in FIG. 3 corresponds to 50 code and 100 code in FIG. 7A and FIG. 7B. In other words, Acode (or Bcode) is different in every module, and in the present example, the code is converted into arbitrary Xcode (or Ycode).

Figure 9:
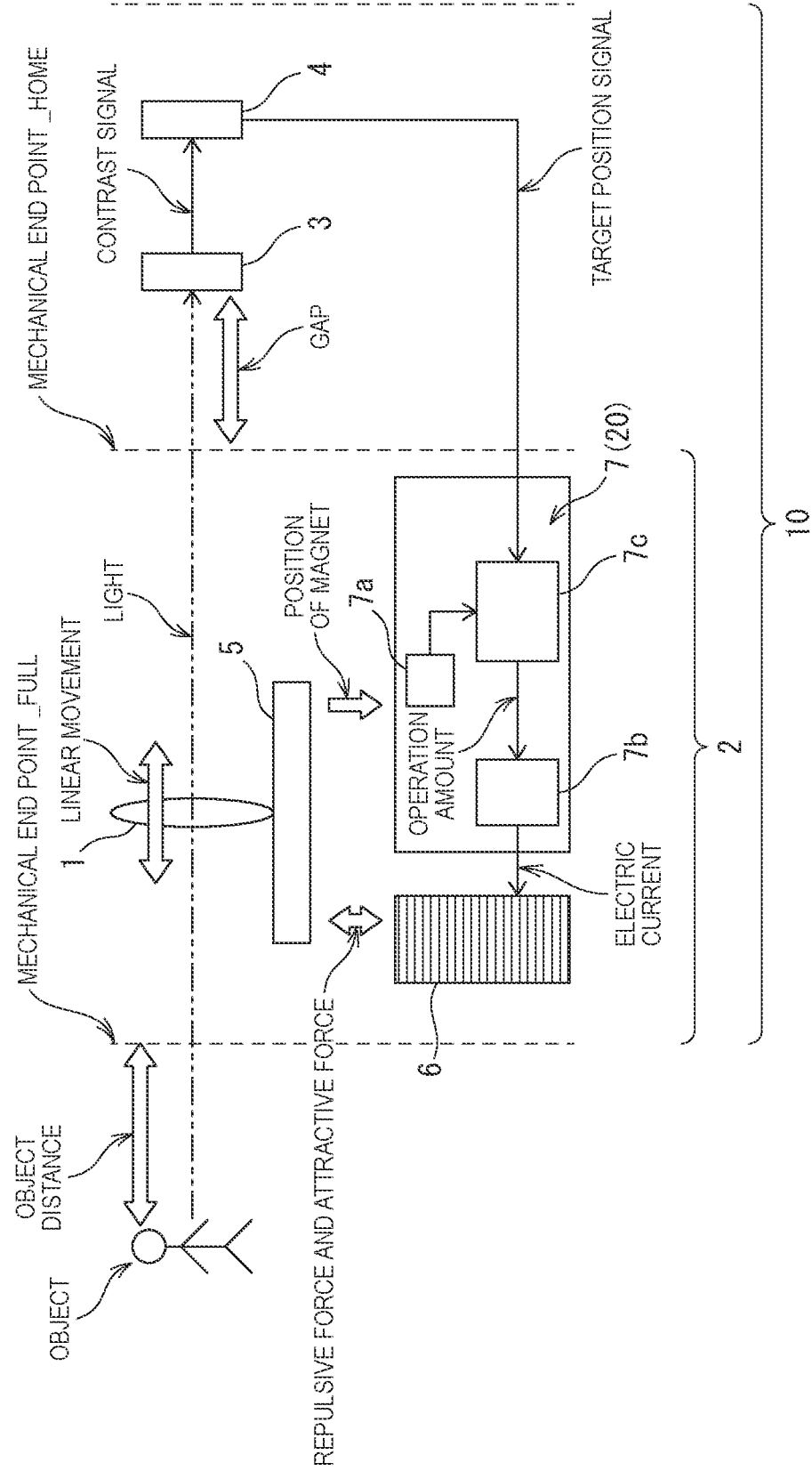
FIG. 9 is a configuration view illustrating the camera module that serves as a basis of the present invention.

FIG. 9 is a configuration view illustrating the camera module that serves as a basis of the present example. The camera module 10 includes an actuator unit 2 configured to linearly move an AF lens 1, an imaging element 3 such as a CMOS sensor or a CCD sensor, and a signal processing circuit 4 configured to determine the target position signal of the AF lens 1 from a contrast signal of the object M sent from the imaging element 3. It is to be noted that the signal processing circuit 4 may be arranged outside the camera module 10.

The actuator unit 2 includes a magnet 5 secured to the AF lens 1 that linearly moves, a drive coil 6 configured to generate a repulsive force and an attractive force to linearly move the magnet 5, and an IC circuit 7 (corresponding to a reference numeral 20 in FIG. 10) configured to detect a position of the magnet 5 and to control a quantity and a direction of an electric current that flows across the drive coil 6. In addition, the IC circuit 7 includes a magnetic field sensor 7a configured to detect the location of the magnet 5, a driver circuit 7b configured to determine the quantity and the direction of the electric current that flows across the drive coil 6, and a PID control circuit 7c configured to determine an operation amount of the driver circuit 7b from a deviation of the location of the magnet 5 and the target position thereof.

The AF lens 1 linearly moves in a discrete manner between a mechanical end point_FULL and a mechanical end point_HOME in the actuator in accordance with a digitized target position signal. The AF control is an operation of moving the AF lens 1 to a point where the contrast signal of the object is the largest one. The position of the AF lens 1 where the contrast signal of the object M is the largest one is different depending on an object distance between the object M and the camera module 10. Therefore, a contrast detection method or distance measurement method is used as the AF control. The contrast detection method is a method of searching for the point where the contrast signal of the object M output from the imaging element 3 is the largest one by successive approximation to move the AF lens 1. The distance measurement method is a method of measuring the object distance between the object M and the camera module 10 with a distance measurement sensor, and calculating the position where the contrast signal is the largest one with the object distance to move the AF lens 1.

Generally, in order to obtain images with high accuracy with a mass-produced camera module, no distribution in the object distance at the time focusing on may be desirable, when the magnet is located at the mechanical end point FULL and the mechanical end point HOME, regardless of the manufacturing variations of the actuator and the camera module. At the time of assembling, however, in the actuator, a manufacturing variation may occur at a stroke between the mechanical end point_FULL and the mechanical end point_HOME. At the time of assembling, in the camera module, a manufacturing variation may occur at a gap between the mechanical end point_HOME and the imaging element.

It is to be noted that when the object distance at the time of focusing on is away from the camera module, the AF lens is located near the mechanical end point_HOME, whereas when the object distance at the time of focusing is near the camera module, the AF lens is located near the mechanical end point_FULL.

Generally, for every camera module, a relationship of the object distance (focus distance) and the code values are stored in an image signal processor (ISP: Image Signal Processor) or an external memory, so that the ISP refers to the stored content to move the AF lens in a predetermined object distance. In this situation, when the manufacturing variation occurs at the gap between mechanical end point_HOME and the imaging element in every camera module, as described above, the relationship of the code value and the object distance (focus distance) may be different in every camera module. In such a case, the AF lens is moved from the AF lens position that is not used basically. In other words, there is a need to move the AF lens in a useless segment, and thus the AF speed decreases. Thus, in a conventional example, for every camera module, an available code value range is limited, or the distance between the actuator and the imaging element is physically adjusted to be an arbitrary one.

Figure 10:
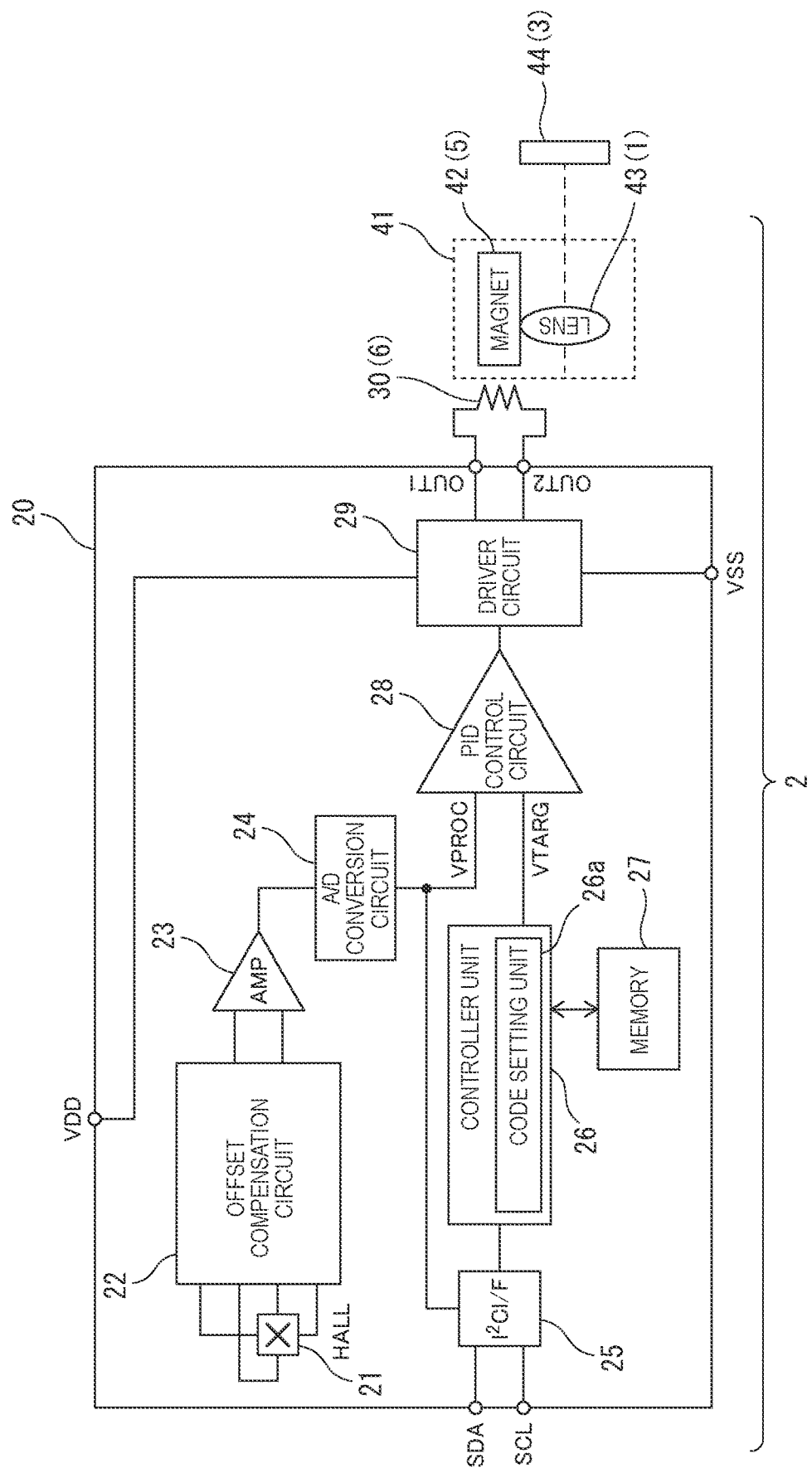
FIG. 10 is a configuration view illustrating a control device of a linear movement device according to one aspect of the present invention.

FIG. 10 is a configuration view illustrating a control device of a linear movement device in the present example. Reference numeral 20 represents the control device, reference numeral 21 (7a) represents a magnetic field sensor (Hall element), reference numeral 22 represents an offset compensation circuit, reference numeral 23 represents an amplifier, reference numeral 24 represents an A/D conversion circuit, reference numeral 25 represents an I2CIF (interface), reference numeral 26 represents a controller unit, reference numeral 26a represents a code setting unit, reference numeral 27 represents a memory, reference numeral 28 (7c) represents a PID control circuit (control unit), reference numeral 29 represents a driver circuit, reference numeral 30 (6) represents a drive coil, reference numeral 40 represents a camera module, reference numeral 41 represents a linear movement device, reference numeral 42 (5) represents a magnet, and reference numeral 43 (1) represents an AF lens. It is to be noted that in FIG. 10, the same reference numerals are applied to the same components having the same functions in FIG. 8.

In addition, the I$^2$C (I-squared-C, I2C) is a serial bus of connecting a low-speed peripheral device to a mother board, or is used in an assembled system or a mobile telephone. I2C is an abbreviation of Inter-Integrated Circuit. I-squared-C is an official way of reading, and is often represented as I2C.

The control device 20 of the linear movement device in the present example is capable of moving the lens 43 secured to the magnet 42 with a force generated by the coil electric current flowing across the drive coil 30, in an actuator module including the linear movement device 41 including the magnet 42 attached with the moving body 43, and the drive coil 30 located near the magnet 42 of the linear movement device 41.

The magnetic field sensor 21 detects the magnetic field generated by the magnet 42, and outputs a detection location signal value VPROC corresponding to a value of the detected magnetic field. The controller unit 26 outputs a target position signal value VTARG instructing the target position to which the linear movement device 41 is to move.

The memory 27 stores the lens position from a reference position and a code value corresponding to the lens position. The controller unit 26 connected with the memory 27 includes a code setting unit configured to reset the code value that has been already stored in the memory 27 to a new code value. The code setting unit 26a may be configured such that users can set the code value and that the code value can be set by an external signal input from an SDA/SCL terminal connected to the outside.

It is to be noted that here the calibration means that detection position operation signal values VPROC corresponding to a first position signal value NEGCAL corresponding to a home position of the linear movement device 41 and a second position signal value POSCAL corresponding to a full position of the linear movement device 41 is obtained and then stored in the memory 27.

The PID control circuit 28 generates the control signal for moving the lens 43 to a target position, by carrying out the PID control based on the detection position signal value VPROC output from the magnetic field sensor 21 and the target position signal value VTARG output from the controller unit 26.

The driver circuit 29 supplies a drive current to the drive coil 30 based on the control signal generated by the PID control circuit 28.

In FIG. 10, a case of applying the control device in the present example to the control device 20 configured to adjust the position of the lens of the camera module 40 will be described. The control device (position control circuit) 20 is configured to be, for example, an IC circuit. It is to be noted that the camera module 40 includes a linear movement device 41 and a drive coil 30 that moves a lens 43. Thus, the electric current is flown across the drive coil 30, and then the magnet 42 is moved, so that the position of the lens 43 secured to the magnet 42 can be adjusted.

In other words, the control device 20 of the linear movement device 41 includes the linear movement device 41 including the magnet 42 attached to a lens (moving body) 43, where the drive coil 30 arranged near the magnet 42 of the linear movement device 41, such that a force generated by the coil electric current flowing across the drive coil 30 moves the magnet 42.

The magnetic field sensor 21 detects the magnetic field generated by the magnet 42, and outputs the detection position signal value VPROC corresponding to the value of the detected magnetic field. In other words, the magnetic field sensor 21 converts the magnetic field generated by the magnet 42 of the camera module 40 into an electrical signal, and then outputs the detection position signal to the amplifier 23. The amplifier 23 amplifies the detection position signals input from the magnetic field sensor 21 through the offset compensation circuit 22. It is to be noted that the magnetic field sensor 21 may be a Hall element.

In addition, the A/D conversion circuit 24 carries out an A/D conversion on the detection position signal detected by the magnetic field sensor 21 and amplified by the amplifier 23, and obtains the detection position signal value VPROC that has been subjected to the A/D conversion.

In addition, the controller unit 26 controls a device (lens) position to output the target position signal value VTARG, and is connected with the PID control circuit 28.

In addition, the PID control circuit 28 is connected with the A/D conversion circuit 24 and the controller unit 26, receives the detection position signal value VPROC that is an output signal from the A/D conversion circuit 24 and the target position signal value VTARG that is an output signal from the controller unit 26, and carries out the PID control.

In other words, the PID control circuit 28 receives the detection position signal value VPROC from the A/D conversion circuit 24 and the target position signal value VTARG of the lens position generated by the device (lens) position controller unit 26, and then outputs the control signal to move the lens 43 to the target position from a current position of the lens 43 and the target position of the lens 43 instructed by the target position signal value VTARG.

The PID control is one type of feedback control, and is a method of controlling an input value by using three elements including a deviation of an output value and a target value, an integration thereof, and a differential thereof. Proportional control (P control) is given as basic feedback control. This control means that the input value is controlled as a linear function of the deviation of the output value and the target value. In the PID control, an operation of changing the input value in proportion to the deviation is referred to as proportional operation or P operation (P is an abbreviation of PROPORTIONAL). In other words, when a state where there is a deviation continues for a long time, the change in the input value is increased as the continuing time to get closer to the target value. An operation of changing the input value in proportion to an integral of the deviation is referred to as integral operation or I operation (I is an abbreviation of INTEGRAL). Thus, the controlling method of combining the proportional operation and the integral operation is referred to as the PI control. An operation of changing the input value in proportion to the differential of the deviation is referred to as differential operation or D operation (D an abbreviation of DERIVATIVE or DIFFERENTIAL). The controlling method of combining the proportional operation, the integral operation, and the differential operation is referred to as the PID control.

The output signal from the PID control circuit 28 is subjected to the D/A conversion by the D/A conversion circuit (not illustrated). The driver circuit 29 supplies the drive current to the drive coil 30 based on the detection position operation signal value VPROC and the target position signal value VTARG. In other words, the driver circuit 29 generates output signals Vout1 and Vout2 based on the control signal output from the PID control circuit 28. The output signals Vout1 and Vout2 are supplied to both ends of the drive coil 30 of the camera module 40.

It is to be noted that in the above description, the linear movement device includes the lens (moving body) 43 and the magnet 42 attached to the lens (moving body) 43. However, the linear movement device can be configured to further include the drive coil.

In this manner, even when the movable range of the lens is changed, the accurate position control is enabled without changing the response characteristic of the linear movement device.

That is, the lens positions at the time of the calibration to obtain the detection position operation signal values (VPROC) corresponding to the first position signal value NEGCAL corresponding to the home position of the linear movement device 41 and the second position signal value POSCAL corresponding to the full position of the linear movement device 41, and the code values corresponding to the lens positions are stored in the memory 27.

In the present example, as to an object having an arbitrary object distance, the position of the lens stored in the memory 27 and the corresponding code value are rewritten. In the memory 27, the lens position of the lens focusing on an object located at a predetermined object distance (for example, 3 m or 10 cm) illustrated in FIG. 9 and the corresponding code values (A and B are set, here) are stored immediately after the calibration. In the example, A and B are rewritten to X and Y.

It is to be noted that the case where the controller unit 26 includes the code setting unit 26a has been described. However, the code setting unit may be arranged outside the controller unit 26.

FIG. 11 is a view illustrating a flow chart of a controlling method of the linear movement device in the present example. The controlling method of the linear movement device to which the control device in the present example is applied is separated to a preliminary preparation and an actual operation.

The preliminary preparation includes carrying out the calibration, and rewriting the lens positions stored in the memory and the corresponding code values to arbitrary values in the controlling method of the present example (step S1).

The actual operation includes arranging the linear movement device 41 including the magnet 42 attached to the moving body 43 and the drive coil 30 arranged near the magnet 42 of the linear movement device 41, so that the force generated by flowing the coil electric current across the drive coil 30 controls the linear movement device 41 that moves the lens 43 secured to the magnet 42.

Firstly, the controller unit converts the target position signal input through the I²CIF25 from the outside into the value stored in the memory, and then outputs the target position signal value VTARG (step S2). Next, the magnetic field sensor 21 detects the magnetic field generated by the magnet 42, and outputs the detection position signal value corresponding to the value of the detected magnetic field (step S3).

Then, the control unit 28 generates the control signal by carrying out the PID control to move the lens 43 to the target position based on the detection position signal value VPROC and the target position signal value VTARG (step S4). Next, the driver circuit 29 supplies the drive current to the drive coil 30 based on the control signal (step S5).

As described above, according to the present invention, in the state of the camera module in which an imaging element and an actuator are combined, an adjusting method of a camera module in which optimization of at least one arbitrary focus object distance is enabled, a lens position control device, a control device of a linear movement device, and a controlling method of the same are provided. Images with high accuracy are obtainable and the AF speed is increased, regardless of the manufacturing variation of the camera module.

Heretofore, the present invention has been described with reference to specific embodiments, but the descriptions do not intend to limit the invention. It would be apparent to a person skilled in the art that other embodiments as well as various modification examples of the embodiments that have been described are included with reference to the descriptions pf the present invention. Accordingly, it should be understood that the scope of claims cover modification examples and embodiments included in the technical scope and subject matters.

REFERENCE SIGNS LIST

1, 43 AF lens
2 actuator unit
3 imaging element
4 signal processing circuit
5, 42 magnet
6, 30 drive coil
7 IC circuit
7a, 21 magnetic field sensor (Hall element)
7b, 29 driver circuit
7c, 28 PID control circuit
10, 40 camera module
20 control device
22 offset compensation circuit
23 amplifier
24 A/D conversion circuit
25 I²CIF (interface)
26 controller unit
26a code setting unit
27 memory
40 camera module
41 linear movement device
50 lens
51 imaging element
52 signal processing circuit
63 position sensor
54 lens position control circuit
55 drive unit
541 memory
542 target position signal generation unit
543 control unit
56 converter
545 adjustment unit
110 magnet
111 coil
112 linear movement device
113 magnetic field sensor
114 differential amplifier
115 non-inverting output buffer
116 inverting output buffer
117 first output driver
118 second output driver

The invention claimed is:

1. A control device of a linear movement device, the linear movement device comprising a magnet attached to a moving body, wherein a drive coil is arranged near the magnet of the linear movement device, such that a force generated by a coil electric current flowing across the drive coil moves a lens secured to the magnet, the control device comprising:
a magnetic sensor configured to detect a magnetic field generated by the magnet, and to output a detection position signal value corresponding to a value of the detected magnetic field;
a controller configured to output a target position signal value to instruct a target position to which the linear movement device is to move;
a memory connected with the controller and configured to store relationships of lens positions and position code values;
a control circuit configured to generate a control signal to move the lens to the target position based on the detection position signal value output from the magnetic sensor and the target position signal value output from the controller unit; and
a driver circuit configured to supply a drive current to the drive coil based on the control signal output from the controller,
wherein the controller comprises a code setting circuit configured to rewrite at least one of the position code values stored in the memory to other position code values such that a moving range of the lens per the position code values is limited based on a first focus distance.

2. The control device of the linear movement device according to claim 1, wherein the code setting circuit is configured such that a user is able to set the code values.

3. The control device of the linear movement device according to claim 1, wherein the code setting circuit is configured to set the code values by an external signal input.

4. The control device of a linear movement device according to claim 1, wherein the magnetic sensor is a Hall element.

5. The control device of the linear movement device according to claim 1, wherein the linear movement device and the drive coil are assembled in a camera module.

6. A control device of a linear movement device, the linear movement device comprising a magnet attached to a moving body, wherein a drive coil arranged near the magnet of the linear movement device, such that a force generated by a coil electric current flowing across the drive coil moves a lens secured to the magnet, the control device comprising:
a magnetic sensor configured to detect a magnetic field generated by the magnet, and to output a detection position signal value corresponding to a value of the detected magnetic field;
a controller configured to output a target position signal value to instruct a target position to which the linear movement device is to move;
a memory connected with the controller and configured to store relationships of lens positions and code values;
a code setting circuit configured to rewrite at least one of the position code values stored in the memory to other position code values such that a moving range of the lens per the position code values is limited based on a first focus distance;
a control circuit configured to generate a control signal to move the lens to the target position based on the detection position signal value output from the magnetic sensor and the target position signal value output from the controller; and
a driver circuit configured to supply a drive current to the drive coil based on the control signal output from the controller.

7. A controlling method of a linear movement device, the linear movement device comprising a magnet secured to a moving body, wherein a drive coil is arranged near the magnet of the linear movement device, the controlling method comprising:
storing, in a memory, relationships of lens positions and position code values;
carrying out calibration to rewrite the position code values corresponding to the lens positions, stored in the memory, to other position code values such that a moving range of the lens per the position code values is limited based on a first focus distance;
converting by a controller unit a target position signal input through an interface from an outside of the linear movement device into the a code value stored in the memory to output the target position signal value;
detecting by a magnetic field sensor a magnetic field generated by the magnet to output a detection position signal value corresponding to a value of the detected magnetic field;
generating by a control unit a control signal to move the lens to a target position based on the detection position signal value and the target position signal value; and
supplying by a driver circuit a drive current to the drive coil based on the control signal.

\* \* \* \* \*